US008627326B2

(12) United States Patent
    Gebhart

(10) Patent No.: US 8,627,326 B2
(45) Date of Patent: Jan. 7, 2014

(54) SYSTEM AND METHODS FOR USING A QUANTITATIVE APPLICATION MEASUREMENT TO DETERMINE WHETHER TO INSTANTIATE AN APPLICATION

(75) Inventor: Alexander Gebhart, Ubstadt-Weiher (DE)

(73) Assignee: SAP AG, Walldorf (DE)

( * ) Notice: Subject to any disclaimer, the term of this patent is extended or adjusted under 35 U.S.C. 154(b) by 1763 days.

(21) Appl. No.: 11/313,651

(22) Filed: Dec. 22, 2005

(65) Prior Publication Data
    US 2007/0150896 A1    Jun. 28, 2007

(51) Int. Cl.
    *G06F 9/46*    (2006.01)
(52) U.S. Cl.
    USPC .......................................................... 718/104
(58) Field of Classification Search
    USPC .................................. 718/104–105; 711/169
    See application file for complete search history.

(56) References Cited

U.S. PATENT DOCUMENTS

| | | | | |
|---|---|---|---|---|
| 6,360,364 B1 * | 3/2002 | Chen et al. | ...................... | 711/169 |
| 6,601,084 B1 * | 7/2003 | Bhaskaran et al. | ............ | 718/105 |
| 7,050,913 B2 * | 5/2006 | Cox | ................................. | 702/60 |
| 7,146,353 B2 * | 12/2006 | Garg et al. | ............................. | 1/1 |
| 7,281,154 B2 * | 10/2007 | Mashayekhi et al. | ........ | 714/4.11 |
| 7,827,557 B2 * | 11/2010 | Zhu et al. | ....................... | 718/104 |
| 2002/0046316 A1 | 4/2002 | Borowsky et al. | | |

FOREIGN PATENT DOCUMENTS

EP    0714062 A3    10/1997

OTHER PUBLICATIONS

Graupner, et al., "A framework for analyzing and organizing complex systems", Engineering of Complex Computer Systems, Proceedings, Seventh IEEE International Conference, Jun. 11, 2001 (pp. 155-165).
"LSF Batch User's Guide", Platform Computing, Aug. 1998 (pp. 1-226).

* cited by examiner

*Primary Examiner* — Meng An
*Assistant Examiner* — Eric C Wai
(74) *Attorney, Agent, or Firm* — Mintz Levin Cohn Ferris Glovsky and Popeo, P.C.

(57) ABSTRACT

Systems and methods are disclosed for quantitative measurements of an application and a computer. In one exemplary embodiment, there is provided a method for determining whether to instantiate an application on one of a plurality of interconnected computers. Moreover, the method includes receiving information regarding the application to be instantiated on the computer; receiving information regarding the computer on which the application is to be instantiated; determining a dual measurement based on the received application information and the received computer information; and determining whether to instantiate the application based on the determined dual measurement.

10 Claims, 5 Drawing Sheets

SYSTEM AND METHODS FOR USING A QUANTITATIVE APPLICATION MEASUREMENT TO DETERMINE WHETHER TO INSTANTIATE AN APPLICATION

BACKGROUND

I. Field of the Invention

The present invention relates to data processing. More particularly, the present invention relates to quantitative measurements of applications at one or more computers in a multiprocessor computing environment.

II. Background and Material Information

In multiprocessor computing environments, such as distributed, parallel, grid, or peer-to-peer computing environments, an application may be instantiated (or executed) on a computer. However, the source of an application that will be instantiated on a computer may not have any information concerning the state of the computer or the state of any applications on the computer. The lack of such state information may become a concern when there are insufficient resources at the computer to accommodate a new application. When there are insufficient resources at the computer, the performance of the computer and its applications degrade. For example, computer performance degradations may occur when there is insufficient memory at the computer or when CPU (central processing unit) utilization is too high. Performance degradations of an application can manifest themselves when the application has too many incoming calls, too many started threads, and the like.

In a multiprocessor computing environment, knowledge of performance degradations can be used to decide whether to open a new instance of an application (or execute the new application) at a computer. For example, in a multiprocessor environment, a source computer may prefer instantiating a new application at a computer with sufficient resources to avoid having any performance degradations. In contrast, if a new application is instantiated (or executed) at a computer with insufficient resources, it is more likely that performance degradations will impact the computer or the application.

SUMMARY

Systems, methods, and articles of manufacture consistent with the invention provide for quantitative measurements of an application or a computer.

In one exemplary embodiment, there is provided a method for determining whether to instantiate an application on one of a plurality of interconnected computers. Moreover, the method includes receiving information regarding the application to be instantiated on the computer; receiving information regarding the computer on which the application is to be instantiated; determining a measurement based on the received application information and the received computer information; and determining whether to instantiate the application based on the measurement.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
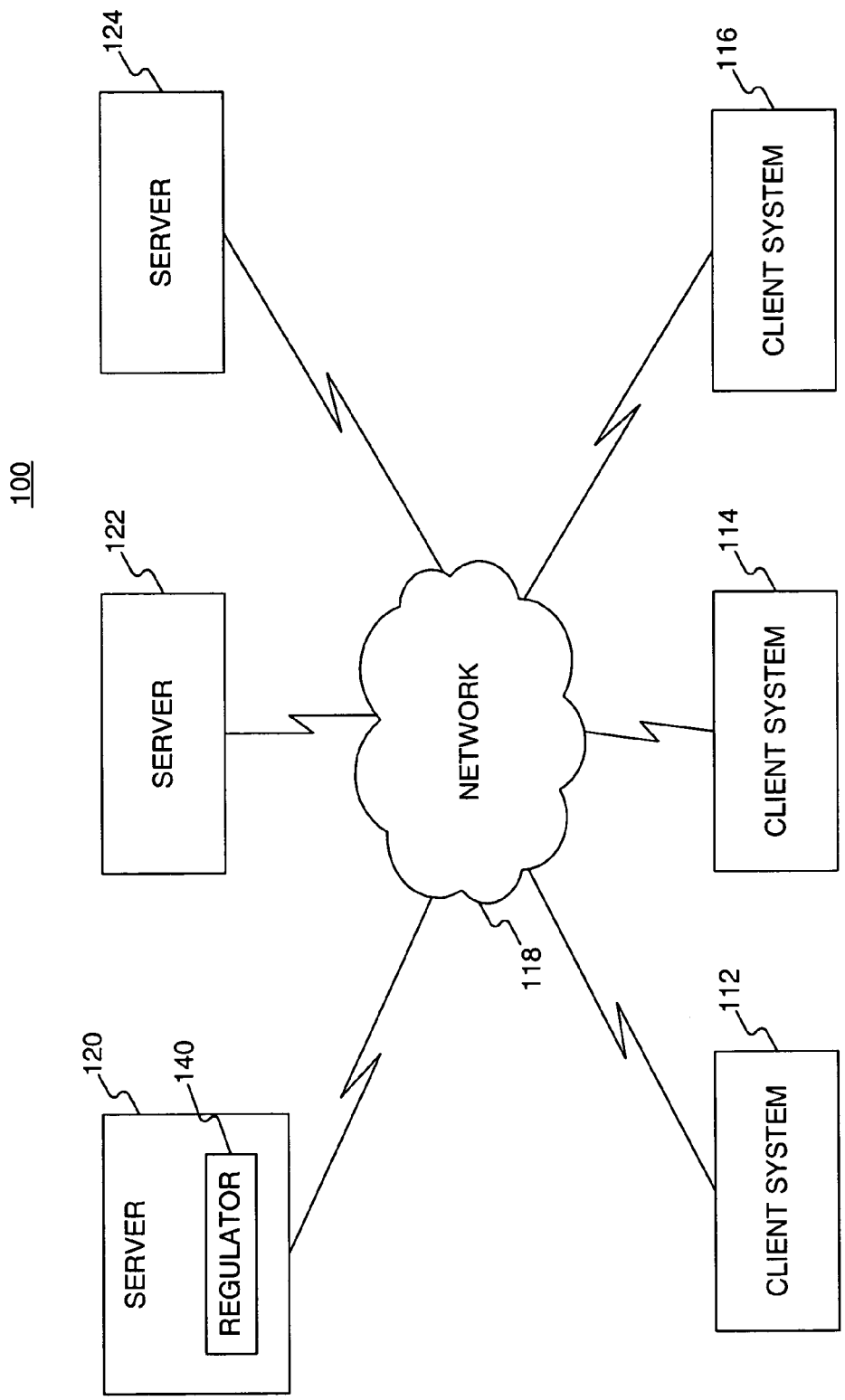
FIG. 1 illustrates a block diagram of an exemplary system environment consistent with certain aspects related to the present invention.

FIG. 1 illustrates a block diagram of an exemplary system environment 100 consistent with certain aspects related to the present invention. Referring to FIG. 1, system 100 includes client systems 112-116 connected by a network 118 to one or more servers 120-124. Although the description of system 100 is made in the context of a client-server environment, any other environment can be used instead.

In one exemplary embodiment, there is provided a regulator 140 for determining whether to instantiate a new application on one of a plurality of interconnected computers, such as servers 120-124 or clients 112-116. Moreover, regulator 140 may receive information regarding the application to be instantiated on the computer and receive information regarding the computer on which the application is to be instantiated. The computer on which the application is to be instantiated can be any computer, such as server 122. Regulator 140 then determines a measurement based on the received application information and the received computer information. Based on the determined measurement, regulator 140 determines whether to instantiate the application. For example, if the measurement indicates that the computer, such as server 112, has sufficient resources to accommodate the new application, regulator 140 allows that application to be instantiated on the computer. If the measurement indicates that the computer has insufficient resources for the new application, regulator 140 may not allow the application to be instantiated. In some cases, regulator 140 may then evaluate another computer, such as server 124, to determine whether it has sufficient resources. The use of regulator 140 may enable a computer having a regulator to autonomously instantiate applications in one or more computers of a multiprocessor computing environment.

Clients 112-116 may each include a computer capable of making a request through network 180 to instantiate an application on servers 120, 122, 124. As used herein, the term "instantiate" means, in an object oriented programming environment, an object of a particular class, and, more generally, includes deploying, customizing, running and/or executing an application.

A computer suitable for use as a client or a server includes, among other things, a processor for executing instructions and one or more memory devices for storing computer program instructions and data. The computer may also receive data from and/or transfer data to one or more mass storage devices for storing data, e.g., magnetic, magneto optical disks, or optical disks. Furthermore, the computer may be capable of interfacing to a network, such as network 118.

Network 118 may include, alone or in any suitable combination, a telephony-based network, a local area network (LAN), a wide area network (WAN), a dedicated intranet, a wireless LAN, the Internet, a wireless network, a bus, or any other any communication mechanisms. Further, any suitable combination of wired and/or wireless components and systems may be used to provide a communication mechanism. Moreover, network 118 may be embodied using bi-directional or unidirectional communication links. Further, network 118 may utilize protocols such as Transmission Control Protocol/Internet Protocol (TCP/IP), Hyper Text Transfer Protocol (HTTP), SOAP (Simple Object Access Protocol), and Remote Procedure Call (RPC).

Servers 120-124 may each include a computer with a coupled storage device and a memory. The memory may contain an operating system, one or more applications as well as their corresponding interfaces. Moreover, the memory may further include regulator application 140. Regulator 140 can be implemented as a software application that controls whether an application should be instantiated at a computer, such as a server of system 100. Regulator 140 receives information regarding measurements of the computer and/or its operating system (e.g., available memory at a server, processing power of a server, available disk space at a server, available network bandwidth at server, and the like). Furthermore, regulator 140 receives information regarding measurements of the application to be instantiated (e.g., memory required by the application, processing power required by application, disk space required by the application, bandwidth required by the application, and the like). Based on the received information regarding the computer and the application to be instantiated, regulator 140 determines whether the application should be instantiated at a given computer, such as one of the servers of system 100. Moreover, the measurements may be normalized, so that different types of measurements can be processed, combined, compared, etc. Furthermore, the measurements may be weighted so that importance (or lack thereof) can be taken into account. Although the previous example regarding regulator 140 describes a server, regulator 140 can be used in connection with any computer.

Figure 2:
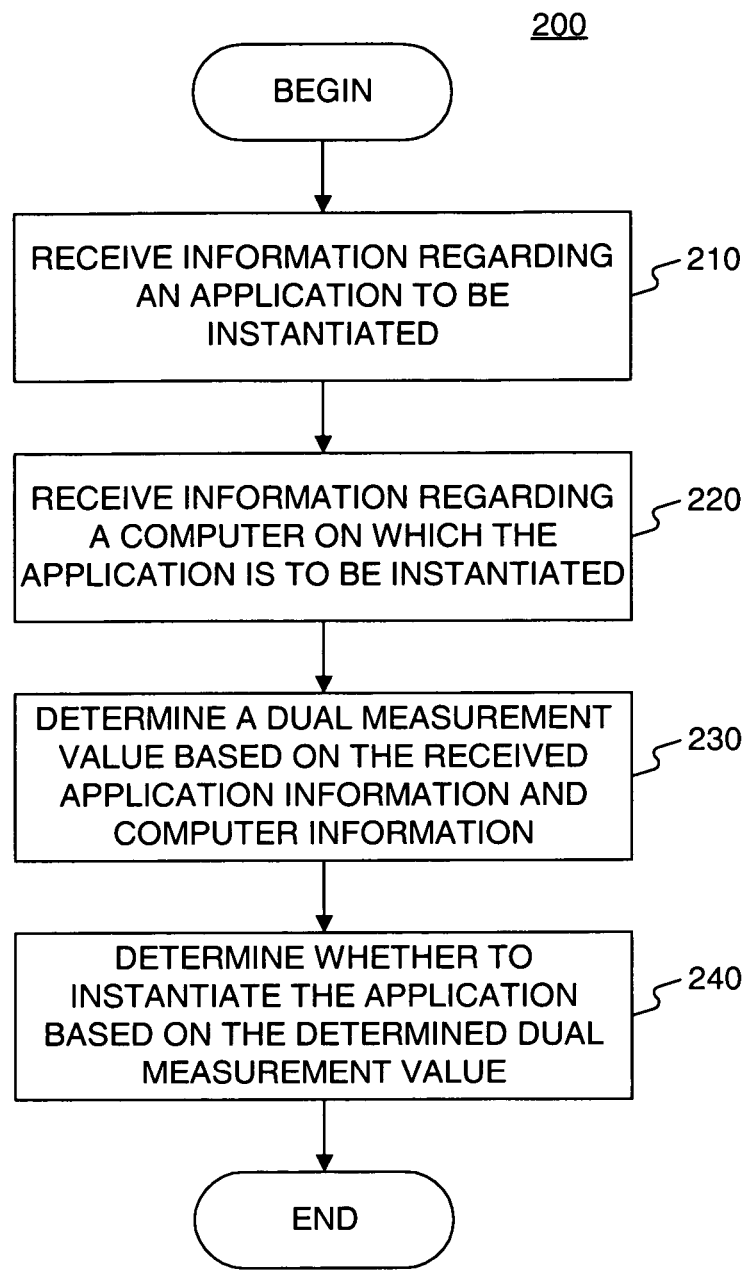
FIG. 2 illustrates an exemplary flow chart with steps consistent with certain aspects related to the present invention.

FIG. 2 illustrates an exemplary flow chart with steps 200 consistent with certain aspects related to the present invention. Regulator 140 may receive information regarding an application to be instantiated (step 210) and receive information regarding a computer on which the application is to be instantiated (step 220). Regulator 140 may then determine a dual measurement value based on the received information of steps 210 and 220. Moreover, regulator 140 may determine, based on the determined dual measurement, whether to instantiate the application on the computer (step 240).

Figure 3A:
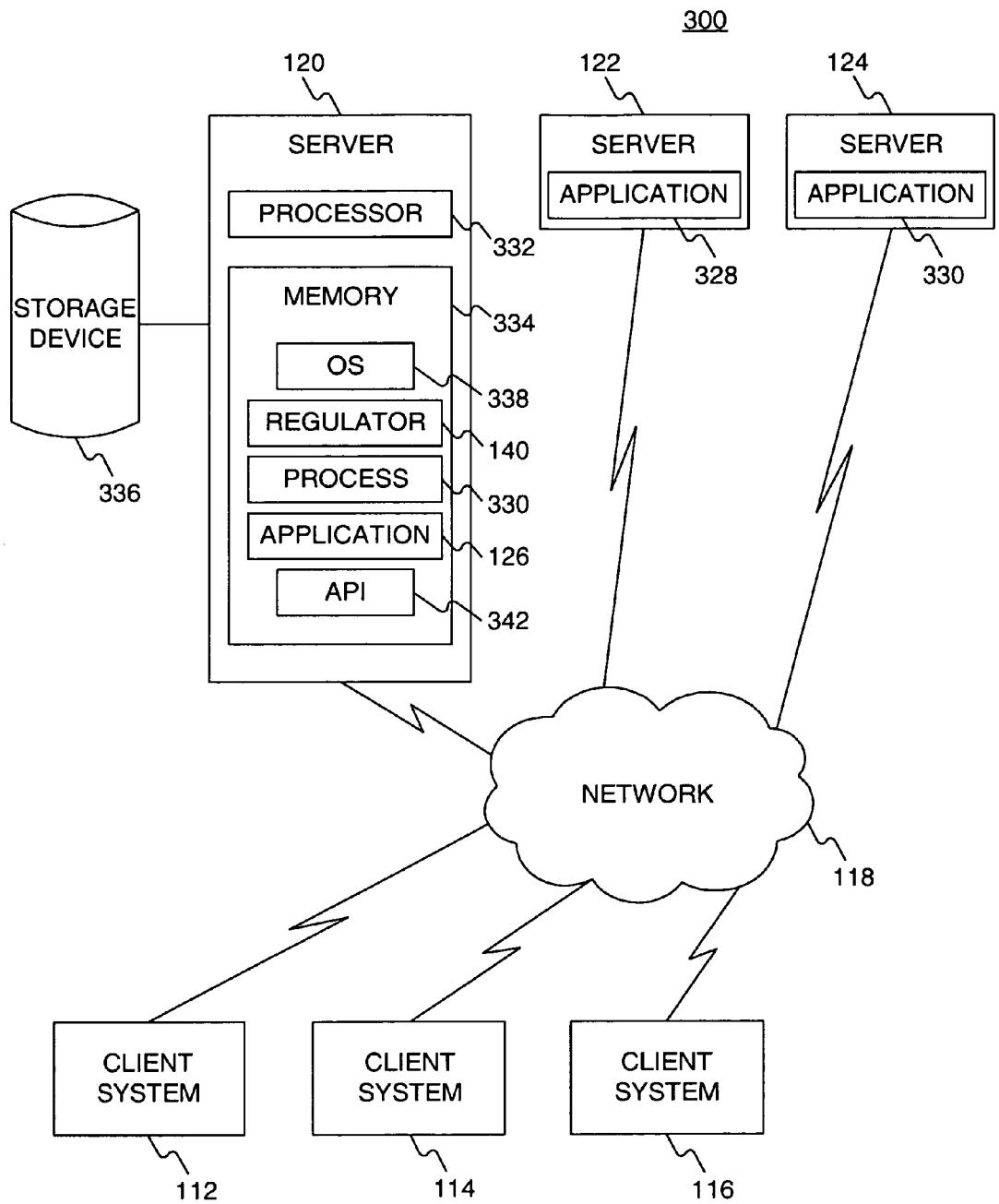
FIG. 3A illustrates a block diagram of another exemplary system environment consistent with certain aspects related to the present invention.

FIG. 3A illustrates a block diagram of another exemplary system environment 300 consistent with certain aspects related to the present invention. FIG. 3A is similar to FIG. 1 in many respects, but shows additional components. Referring to FIG. 3A, server 120 includes a central processing unit (labeled "processor") 332, a memory 334, and a storage device 336 coupled to server 120. Moreover, servers 122 and 124 may each include applications 328, 330, respectively. In some embodiments, servers 120-124 each include multiple applications that when executed, require and consume resources of that server since multiple applications executed at a single server compete for its finite resources. Furthermore, the resources available at any given server may vary over time.

Memory 334 includes an operating system (OS) 338, one or more software applications, such as an application 126, a regulator 140, a process application 330, and an application program interface 342. Memory 334 may include any type of physical memory including RAM, DRAM, FLASH memory, or the like. Storage device 336 may include any storage medium including a disk drive, an optical drive, FLASH memory, or the like.

Application 126 can be any type of software application. As noted above, regulator 140 may be a software application that controls whether one or more instances of applications in the distributed computing environment 100 should be instantiated. In one exemplary embodiment, regulator 140 uses application programming interface (API) 342 to receive quantitative measurement information about an application to be instantiated at a server (step 210). API 342 may provide information regarding the application, such as system resources needed by the application including required processing, required main memory, required disk space, required network bandwidth, and the like. Moreover, the information regarding the application may be stored, for example, in a storage device, such as a database. Alternatively, the information regarding the application can be retrieved through the Internet or an intranet from a service that provides such information. Furthermore, for different applications the information regarding each of the application may be the same or may be different. Regulator 140 may also use API 342 to receive quantitative measurement information concerning the current system resources available on a computer, such as one of the servers 120-124, on which the application is to be instantiated (step 220). Examples of such measurements include the following: processing power available at the computer, available main memory at the computer, available disk space at the computer, available network bandwidth, and the like. Retrieval of the measurements may be implemented using services provided by an operating system or using commercially available tools, such as saposcol (available from SAP AG, Walldorf, Germany).

Regulator 140 may combine the measurement information regarding the application and the system (e.g., server 120) to generate a dual measurement (step 230). As noted above, the dual measurement value may be normalized and/or may be weighted. If such measurements indicate that server 120 can accommodate the instantiation of the application, regulator 140 may allow the application to be instantiated on server 120 (step 240). If such measurements indicate that server 120 cannot accommodate the application, regulator may make additional measurements at another computer, such as server 122 or 124, to determine whether (or where) the application can be instantiated. Thus, regulator 140 controls whether the application is instantiated at a computer, such as server 120.

Figure 3B:
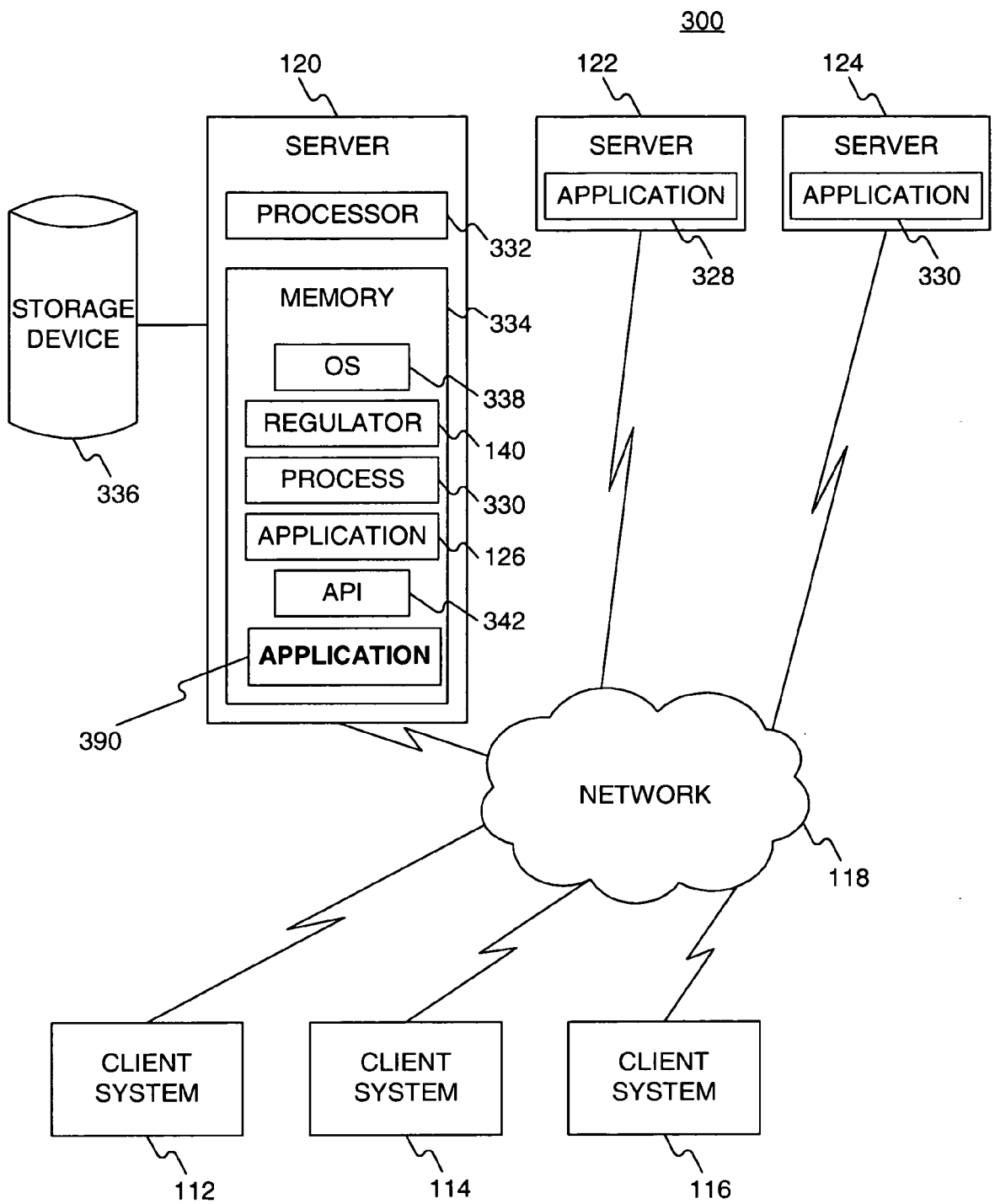
FIG. 3B illustrates the exemplary system of FIG. 3A after the instantiation of an application.

FIG. 3B shows system 300 after regulator 140 allows an application 390 to be instantiated based on the dual measurement. Although server 120 and application 390 are described in the above example, any computer or application can be used instead. Although FIGS. 3A and 3B depict a single regulator 140 at server 140, regulator 140 can be located anywhere and in multiple locations. Moreover, regulator 140 may be implemented as a service available to any computer on a network. Furthermore, although FIGS. 3A and 3B depict that regulator 140 at server 120 determines whether to instantiate an application at server 120, regulator 140 can be used to determine whether to instantiate an application at any computer.

Figure 4:
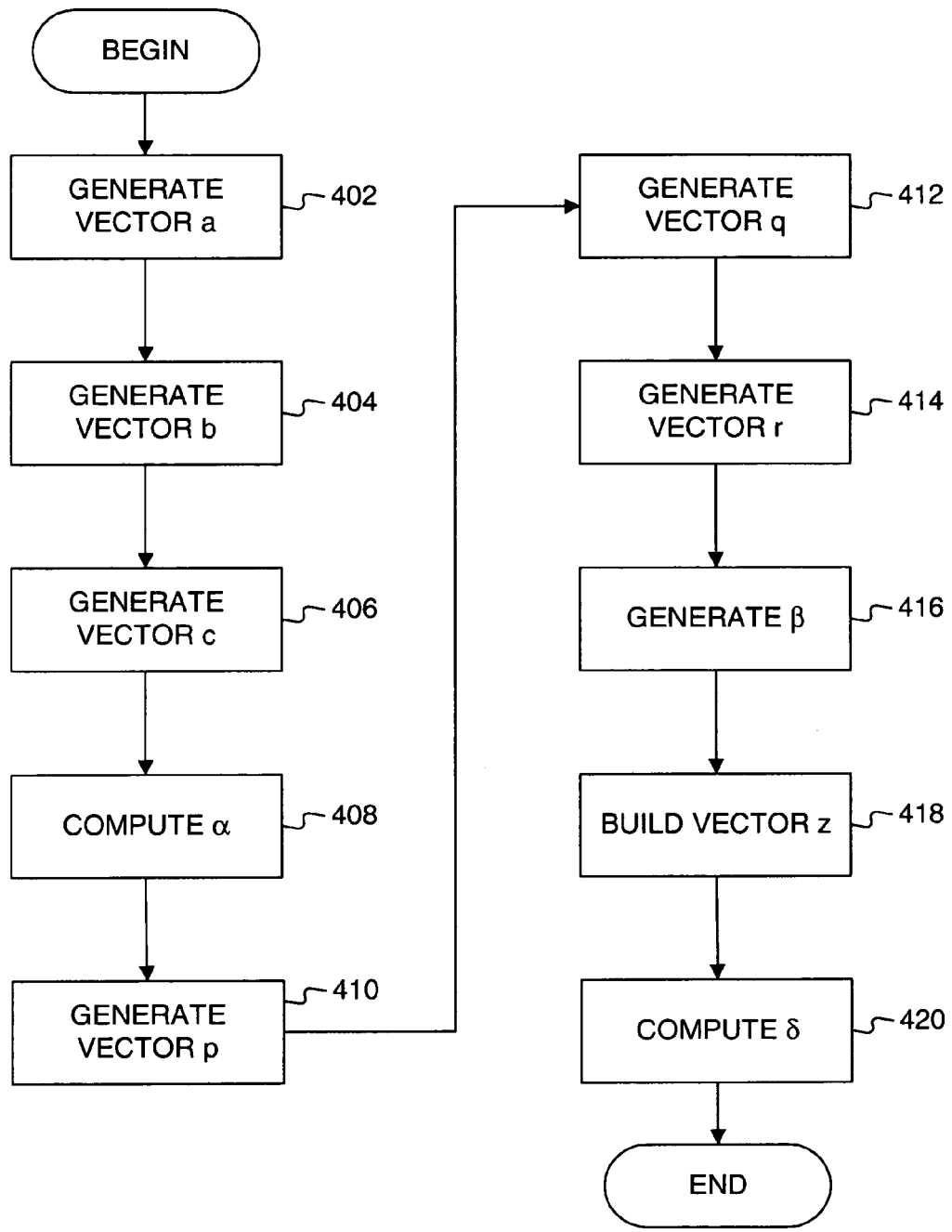
FIG. 4 shows another exemplary flow chart with steps for determining a dual measurement consistent with certain aspects related to the present invention.

FIG. 4 shows another exemplary set of steps 400 for determining a dual measurement value consistent with certain aspects related to the present invention. Steps 400 may be part of process 330 executed by regulator 140 or its corresponding processor 332. Referring to FIG. 4, regulator 140 may receive information regarding a computer, such as server 122, on which an application might be instantiated, and generates a vector (step 402). The generated vector may be determined based on the following equation:

$$a = \begin{pmatrix} a_1 \\ a_2 \\ \vdots \\ a_n \end{pmatrix} \quad \text{Equation 1}$$

where $a=a_1, a_2, \ldots a_n$ represent currently available system resources at server 122. For example, $a_1$ may represent available processing power of the underlying hardware (e.g., server 122), $a_2$ may represent the available memory of the underlying hardware, $a_3$ may represent available disk space of the underlying hardware, and $a_4$ may represent available network bandwidth. As noted above, regulator 140 may use API 342 to gather information regarding server 120 and/or its operating system.

Regulator 140 may receive information regarding the application to be instantiated, such as resources needed by the application, and then generate another vector (step 404). The generated vector b may be determined based on the following equation:

$$b = \begin{pmatrix} b_1 \\ b_2 \\ \vdots \\ b_n \end{pmatrix} \quad \text{Equation 2}$$

where vector $b=b_1, b_2, \ldots b_n$ represent system resources needed by the particular application to be instantiated. For example, $b_1$ may represent processing power required by the application, $b_2$ may represent memory required by the application, $b_3$ may represent disk space required by the application, and $b_4$ may represent network bandwidth required by the application.

Regulator 140 may then generate a third vector c based on vectors a and b of steps 402 and 404. The generated vector c may be determined based on the following equation:

$$c = \begin{pmatrix} c_1 \\ c_2 \\ \vdots \\ c_n \end{pmatrix} \quad \text{Equation 3}$$

where vector $c=c_1, c_2, \ldots c_n$ are determined as a function of vectors a and b. For example, vector $c=c_1, c_2, \ldots c_n$ may be determined by dividing every element of vector a by its corresponding element in vector b. Specifically, $a_1$ is divided by $b_1$, $a_2$ divided by $b_2$, and so forth. Furthermore, if after such division, any element of b is zero (0), then the element is removed from the resulting vector c. If after such division, any element of the resulting vector c is greater than (one) 1, then the greater-than-one element is set to one (1). As such, vector c is normalized to values between zero and one. Although vector c is normalized, some embodiments may not perform such normalization as part of combining vectors a and b to generate vector c.

Regulator 140 may then determine a value a (alpha) within the interval of zero (0) to one (1). More specifically, the value of alpha may be determined based on the following equation:

$$\alpha = \frac{\sum_{i=1}^{n} c_i}{n}. \quad \text{Equation 4}$$

The equation sums all of the elements of vector c and then divides by the value n, which represents the number of elements in vector c.

Regulator 140 may then generate a vector p representing measurements of maximum allowed metrics of the application when executed on a computer (step 410). The generated vector p may be determined based on the following equation:

$$p = \begin{pmatrix} p_1 \\ p_2 \\ \vdots \\ p_n \end{pmatrix} \quad \text{Equation 5}$$

where $p_1, p_2, \ldots, p_n$ are application-specific maximums, for example, $p_1$ may represent a maximum allowed socket load, $p_2$ may represent a maximum allowed reconfigurable functional cache (RFC) load, and so forth. The maximums of Equation 5 may be provided by a user, determined using historical test data, and/or determined using a profiling tool that measures metrics.

Regulator 140 may then generate a vector q corresponding to the current values of vector p (step 412). The vector q may be of the following form:

$$q = \begin{pmatrix} q_1 \\ q_2 \\ \vdots \\ q_n \end{pmatrix} \quad \text{Equation 6}$$

where $q_1$ is the current socket load, $q_2$ is the current RFC load, and $q_n$ is the $n^{th}$ metric.

Regulator 140 then generates vector r based on vectors p and q (step 414). In one embodiment, vector r is determined based on the following equation:

$$r = \begin{pmatrix} r_1 \\ r_2 \\ \vdots \\ r_n \end{pmatrix} \quad \text{Equation 7}$$

where the resulting vector r is determined by dividing every element of vector p by its corresponding element in vector q. Moreover, if the division operation requires a division by zero (0), then the resulting element is simply set to zero (0). If after the division operation, the resulting element is greater than one (1), then the greater-than-one-element is set to one (1).

Regulator 140 then generates a value beta (β) within an interval of zero (0) to one (1). More specifically, the beta value may be determined based on the following equation:

$$\beta = \left( \frac{\sum_{i=1}^{n} r_i}{n} \right)$$

Equation 8 where the components of vector r are all summed, and the result is divided by the quantity n of elements in vector r.

Regulator 140 then generates vector z based on the alpha and beta values determined at steps 408 and 416, respectively. The generation of vector z may be determined based on the following equation:

$$z = \begin{bmatrix} \alpha \\ \beta \end{bmatrix}.$$

Equation 9

Regulator 140 may then determine a value gamma (δ) based on the alpha and beta values determined at steps 408 and 416 (step 120). The value of gamma may be determined based on the following equation:

$$\alpha = \frac{\alpha + \beta}{z}$$

Equation 10 where the gamma value is within an interval of zero (0) to one (1). More specifically, gamma is the average (i.e., equal to the sum of alpha and beta divided by 2) of alpha and beta. When gamma equals one (1), all conditions are appropriate for the instantiating the application (e.g., the resources available are sufficient). When gamma equals zero (0), then none of the requirements of the application are able to be satisfied. In some embodiments, a threshold T is used within the interval of zero (0) to one (1). When the value of gamma is above the threshold T, regulator 140 allows the application to be instantiated. Moreover, when gamma is less than (or equal to) the threshold value T, regulator 40 may indicate that additional computing resources are needed, e.g., another server. Although the above example describes the use of zero and one, such values are exemplary since other values may be used instead to determine whether to instantiate the application.

In some embodiments, weighting vectors w are used according to the following equation:

$$w = \begin{pmatrix} w_1 \\ w_2 \\ \vdots \\ w_n \end{pmatrix}$$

Equation 11 where $w_1, w_2, \ldots, w_n$ are the weights. The weights may have values within the range of zero to infinity. The weights are used to adjust the elements within one of the vectors c, q and z. For example, if element $c_2$ of vector c represents available main memory, it can be weighted relative to the other elements of vector c. For example, $w_2$ can be set equal to two (2), while $w_1$ and the other elements are set to a value of (one) 1. In this example, $c_2$ is adjusted to have twice the impact (or weight) of the other elements. When weighted, $c_2$ will have a greater contribution to gamma, and, as such, may be considered more significant when determining whether to instantiate the application when compared to the other elements of vector c. The subsequent computations of alpha, beta and gamma would change accordingly. For example, the computation of alpha would be based on the following equation:

$$\alpha = \frac{\sum_{i=1}^{n} (c_i * w_i)}{\sum_{i=1}^{n} (w_i)}$$

Equation 12 where $c_i$ is the element being weighted, $w_i$ is the weight for that element, and elements not being weighted have a weight of one (1). The equations for beta and gamma would also change consistent with Equation 12 to accommodate the weight.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed:

1. A method for determining whether to instantiate an application on one of a plurality of interconnected computers, the method comprising:
   receiving by one or more processor-based devices information regarding one or more of resources, including processing power, needed by the application to be instantiated on the one of the plurality of interconnected computers;
   receiving by the one or more processor-based devices information regarding the one or more of resources, including the processing power, available at the one of the plurality of interconnected computers on which the application is to be instantiated;
   receiving by one or more processor-based devices information regarding one or more application-specific maximum metrics of the application;
   receiving by the one or more processor-based devices information regarding one or more measured values for the application-specific maximum metrics of the application;
   determining by the one or more processor-based devices an indicator based on
      the information regarding the one or more of resources, including processing power, needed by the application, wherein the information regarding each resource in the one or more resources needed by the application is associated a respective second value,
      the information regarding the one or more of resources, including the processing power, available, where the information regarding each resource in the one or more resources available is associated with a respective first value,
      the information regarding the one or more application-specific maximum metrics of the application, wherein the information regarding each application specific maximum metric in the one or more application-specific maximum metrics is associated with a respective third value, and
      the information regarding the one or more measured values for the application specific maximum metrics of the application, wherein the information regarding each measured value for the application specific maximum metric in the one or more measured values for the application specific maximum metrics is associated with a respective fourth value;
      wherein the indicator is determined based on a normalized sum of
         a first value associated with a first vector containing a plurality of first weighted ratios of the first values divided by the second values, wherein each first weighted ratio is associated with a corresponding predetermined weight value, and
         a second value associated with a second vector containing a plurality of second weighted ratios of the third values divided by the fourth values, wherein each second weighted ratio is associated with a corresponding predetermined weight value;
      and
   determining by the one or more processor-based devices whether to instantiate the application based on the determined indicator and a predetermined threshold, wherein when the determined indicator is greater than the predetermined threshold, the application is instantiated and when the determined indicator is less than or equal to the predetermined threshold, the application is not instantiated.

2. The method of claim 1, wherein receiving information regarding the application comprises:
   receiving information representative of an amount of main memory required by the application.

3. The method of claim 1 further comprising:
   determining, based on the received one or more resources needed by the application, a vector based on the following equation:

$$a = \begin{pmatrix} a_1 \\ a_2 \\ \vdots \\ a_n \end{pmatrix}$$

wherein a is the determined vector, and $a_1, a_2, \ldots, a_n$ are the individual resources of the one or more resources needed by the application.

4. The method of claim 1, wherein receiving information regarding the one of the plurality of interconnected computers comprises:
   receiving information representative of an amount of memory available at the one of the plurality of interconnected computers.

5. The method of claim 1, wherein the information regarding the one or more of resources further includes an amount of memory, an amount of network bandwidth, and an amount of storage space, and wherein the one or more application-specific maximum metrics of the application comprise a socket load and a cache load.

6. A system for determining whether to instantiate an application on one of a plurality of interconnected computers, the system comprising:
   a processor; and
   a memory, wherein the processor and the memory are configured to perform a method comprising:
      receiving by one or more processor-based devices information regarding one or more of resources, including processing power, needed by the application to be instantiated on the one of the plurality of interconnected computers;
      receiving by the one or more processor-based devices information regarding the one or more of resources, including the processing power, available at the one of the plurality of interconnected computers on which the application is to be instantiated;
      receiving by one or more processor-based devices information regarding one or more application-specific maximum metrics of the application;
      receiving by the one or more processor-based devices information regarding one or more measured values for the application-specific maximum metrics of the application;
      determining by the one or more processor-based devices an indicator based on
         the information regarding the one or more of resources, including processing power, needed by the application, wherein the information regarding each resource in the one or more resources needed by the application is associated a respective second value,
         the information regarding the one or more of resources, including the processing power, available, where the information regarding each resource in the one or more resources available is associated with a respective first value, the information regarding the one or more application-specific maximum metrics of the application, wherein the information regarding each application specific maximum metric in the one or more application-specific maximum metrics is associated with a respective third value, and the information regarding the one or more measured values for the application specific maximum metrics of the application, wherein the information regarding each measured value for the application specific maximum metric in the one or more measured values for the application specific maximum metrics is associated with a respective fourth value;

wherein the indicator is determined based on a normalized sum of
- a first value associated with a first vector containing a plurality of first weighted ratios of the first values divided by the second values, wherein each first weighted ratio is associated with a corresponding predetermined weight value, and
- a second value associated with a second vector containing a plurality of second weighted ratios of the third values divided by the fourth values, wherein each second weighted ratio is associated with a corresponding predetermined weight value;

and determining by the one or more processor-based devices whether to instantiate the application based on the determined indicator and a predetermined threshold, wherein when the determined indicator is greater than the predetermined threshold, the application is instantiated and when the determined indicator is less than or equal to the predetermined threshold, the application is not instantiated.

7. The system of claim 6, wherein receiving information regarding the application comprises:
receiving information representative of an amount of main memory required by the application.

8. The system of claim 6 further comprising:
determining, based on the received one or more resources needed by the application, a vector based on the following equation:

$$a = \begin{pmatrix} a_1 \\ a_2 \\ \vdots \\ a_n \end{pmatrix}$$

wherein a is the determined vector, and $a_1, a_2, \ldots, a_n$ are the individual resources of the one or more resources needed by the application.

9. The system of claim 6, wherein receiving information regarding the one of the plurality of interconnected computers comprises:
receiving information representative of an amount of memory available at the one of the plurality of interconnected computers.

10. A non-transitory computer-readable storage medium containing instructions to configure a processor to perform a method for determining whether to instantiate an application on one of a plurality of interconnected computers, the method comprising:

receiving by one or more processor-based devices information regarding one or more of resources, including processing power, needed by the application to be instantiated on the one of the plurality of interconnected computers;

receiving by the one or more processor-based devices information regarding the one or more of resources, including the processing power, available at the one of the plurality of interconnected computers on which the application is to be instantiated;

receiving by one or more processor-based devices information regarding one or more application-specific maximum metrics of the application;

receiving by the one or more processor-based devices information regarding one or more measured values for the application-specific maximum metrics of the application;

determining by the one or more processor-based devices an indicator based on
the information regarding the one or more of resources, including processing power, needed by the application, wherein the information regarding each resource in the one or more resources needed by the application is associated a respective second value, the information regarding the one or more of resources, including the processing power, available, where the information regarding each resource in the one or more resources available is associated with a respective first value, the information regarding the one or more application-specific maximum metrics of the application, wherein the information regarding each application specific maximum metric in the one or more application-specific maximum metrics is associated with a respective third value, and the information regarding the one or more measured values for the application specific maximum metrics of the application, wherein the information regarding each measured value for the application specific maximum metric in the one or more measured values for the application specific maximum metrics is associated with a respective fourth value;

wherein the indicator is determined based on a normalized sum of
a first value associated with a first vector containing a plurality of first weighted ratios of the first values divided by the second values, wherein each first weighted ratio is associated with a corresponding predetermined weight value, and a second value associated with a second vector containing a plurality of second weighted ratios of the third values divided by the fourth values, wherein each second weighted ratio is associated with a corresponding predetermined weight value, and determining by the one or more processor-based devices whether to instantiate the application based on the determined indicator and a predetermined threshold, wherein when the determined indicator is greater than the predetermined threshold, the application is instantiated and when the determined indicator is less than or equal to the predetermined threshold, the application is not instantiated.

* * * * *